United States Patent [19]

Pieper et al.

[11] Patent Number: 4,687,504

[45] Date of Patent: Aug. 18, 1987

[54] GLASS MELTING FURNACE WITH BOTTOM ELECTRODES

[75] Inventors: Helmut Pieper; Adolf Knauer, both of Lohr; Helmut Sorg, Glattbach, all of Fed. Rep. of Germany

[73] Assignee: Sorg GmbH & Co. KG, Lohr, Fed. Rep. of Germany

[21] Appl. No.: 782,404

[22] Filed: Oct. 1, 1985

[30] Foreign Application Priority Data

Oct. 6, 1984 [DE] Fed. Rep. of Germany ....... 3436793

[51] Int. Cl.$^4$ .............................................. C03B 5/027
[52] U.S. Cl. ....................................... 65/326; 65/337; 65/346; 65/347
[58] Field of Search ................. 65/326, 327, 337, 346, 65/347

[56] References Cited

U.S. PATENT DOCUMENTS 4,012,218  3/1977  Sorg et al. ........................ 65/337 X Primary Examiner—Arthur Kellogg
Attorney, Agent, or Firm—Felfe & Lynch

[57] ABSTRACT

A glass melting furnace including a melting tank heated from above by burners and comprising a melting section as well as a refining and homogenizing section provided with electrodes for the supply of electrical energy; a dam which separates the melting section from the refining and homogenizing section and the upper edge of which is disposed below the surface of the (glass) melt bath; and an outlet for the glass disposed in the bottom portion of the refining and homogenizing section; wherein the bottom of the refining and homogenizing section is in a position deeper than the bottom of the melting section, and the electrodes are arranged in one or more planes (levels) of the refining section, the glass melting furnace being configured such that on the side of the refining section there is provided adjacent to the dam a bottom portion which is disposed at a level substantially above the bottom of the homogenizing section.

16 Claims, 2 Drawing Figures

GLASS MELTING FURNACE WITH BOTTOM ELECTRODES

BACKGROUND OF THE INVENTION

The present invention relates to a glass melting furnace including a melting tank heated from above by burners and comprising a melting section as well as a refining and homogenizing section provided with electrodes for the supply of electrical energy; a dam which separates the melting section from the refining and homogenizing section and the upper edge of which is disposed below the surface of the (glass) melt bath; and an outlet for the glass disposed in the bottom portion of the refining and homogenizing section; wherein the bottom of the refining and homogenizing section is in a position deeper than the bottom of the melting section, and the electrodes are arranged in one or more planes (levels) of the refining section.

Glass melting furnaces of the above type have proved to be useful, because they are not only versatile in application, but are also capable of melting particularly high-quality glass. On the other hand, a drawback of glass melting furnaces of this type is that the dam separating the melting section and the refining or homogenizing section is relatively expensive in structure, because the bricks of this dam must be set deeply into the bottom of the melting tank.

Another drawback of conventional furnaces is that the electrodes installed into the walls are highly subject to corrosion. Further, it is difficult to sufficiently heat up the discharge stream or flow in the center part of the tank.

SUMMARY OF THE INVENTION

It is therefore an object of the invention to provide a glass melting furnace which, while retaining the advantages of the conventional furnaces with combined fossil fuel and electrical heating, avoids the above-mentioned drawbacks. It is a further object to obtain a furnace which is constructed economically, is easily operated and controlled, and provides an improvement in the quality of glass.

According to the present invention, in a glass melting furnace of the type as outlined above these objects are obtained in that on the side of the refining section there is provided, adjacent to the dam, a bottom portion which is disposed at a level substantially above the bottom of the homogenizing section. Advantageously, a plurality of bottom electrodes are disposed in the bottom portion, which electrodes form a row or line, and further electrodes may be positioned in the walls of the refining and homogenizing section, which latter electrodes provide for a better refining process.

Preferably, the wall electrodes are positioned adjacent to the transverse wall of the furnace and connected in such a manner that a current flow takes place along the side walls and the transverse wall. In this way, cold glass streams descending in the vicinity of the wall or walls, without having been sufficiently subjected to the requisite refining or homogenizing process, are avoided.

In order to facilitate the construction of the dam, the latter may form a projected part directed towards the melting section, in a manner similar to a retaining dam; that is, advantageously the dam may be backswept or curved correspondingly with a point directed towards the melting section. Here, the bottom may be approximated by a number of bends.

Surprisingly, th glass melting furnace according to the invention constitutes a further improvement of the conventional combined glass melting furnaces heated by fossil fuel and electricity since this glass melting furnace further increases the efficiency. It is thus an ideal solution to the existing problem.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodimment of the invention.

DESCRIPTION OF PREFERRED EMBODIMENTS

Figure 1:
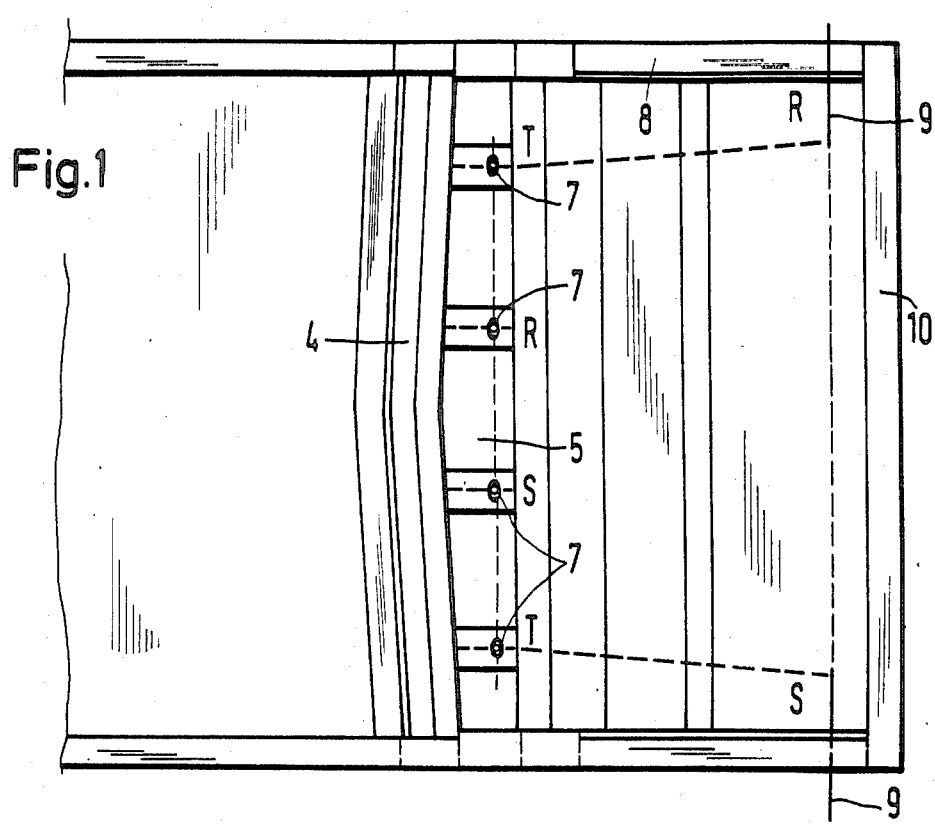
FIG. 1 is a partial plan view of a furnace according to the invention and including the refining and homogenizing section.
Figure 2:
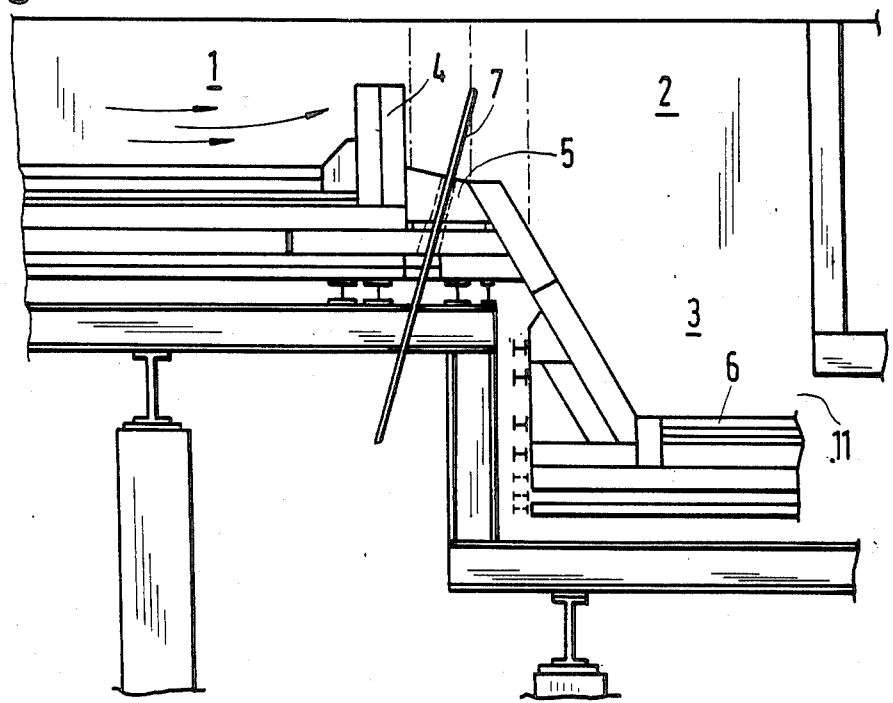
FIG. 2 is a section through the dam portion of the furnace according to FIG. 1.

Referring to FIGS. 1 and 2, a furnace according to the invention comprises a melting section 1 in which the mixture is delivered (not shown), and a subsequent refining and homogenizing section 2 and 3, respectively. The glass is withdrawn from the homogenizing section through an outlet 11. Here, the (glass components) mixture may cover also the surface of the refining section 2.

Homogenizing section 3 is positioned below the refining section 2. In the present invention no energy is supplied to the homogenizing section 3. The glass descends, without turbulence due to the stratification produced in the homogenizing section 3, such that the glass may be withdrawn through the outlet 11, with uniform temperature distribution.

Dam 4, as shown in FIG. 1, separates melting section 1 and refining section 2. Dam 4 is slightly backswept or can be angled in configuration so that it may be supported from the wall portions. As such dam 4 need not be rigidly and strongly anchored in the bottom; thus, the dam construction may be lighter and more economical, while the strength of the dam may be further increased.

Instead of the backswept configuration, dam 4 may also be constructed in a curved or bent configuration towards the melting section 1. Such a curvature can be obtained by forming dam 4 from a number of bends. In this connection, it is essential to the invention that the bricks used are supported at their edges in a manner similar to a retaining dam or a vault, such that, on the whole, a substantially lighter and more filigree-like construction is obtained.

Additionally and according to the invention, dam 4 may be formed as relatively flat and with the shape of a threshold. Such a configuration does not affect the function of the dam with respect to specific glasses. Compared to a higher dam, the anchoring of such a threshold is further simplified.

At the side of the refining section, adjacent to the dam there is provided a bottom portion 5 which is approximately at the same level as the bottom of the melting portion 1 and through which bottom electrodes 7 protrude into the refining section 2.

Bottom electrodes 7 are easily accessible and less subject to corrosion than wall electrodes. The supply of energy between bottom electrodes 7 takes place in parallel with the dam such that even colder central streams or flows may be heated to the necessary refining temperature.

Owing to the bottom electrodes 7, it is possible to heat the primary discharge stream as desired. Accordingly, the melting capacity of a tank may be increased substantially without requiring an increased structural volume for the tank.

Furthermore, the refining process within the refining section 2 is improved in that wall electrodes 9 are installed close to the terminating transverse wall 10. In a circuit connection as shown in FIG. 1, it is thereby possible to generate a current flow not only along the dam, but also along the side walls 8 and along the transverse wall 10. In this way, the production of colder descending streams of flows which would affect the homogeneity of the glass produced by colder walls is avoided.

The electrodes 7 positioned adjacent to dam 4 are connected in such a manner that the currents flow between these electrodes across the shortest possible paths. When using a rotary current transformer, the three phases are applied to adjacently disposed electrodes 7. Then, another rotary current transformer feeds the electrodes 7 positioned on the sides as well as the wall electrodes 9. In this latter method of operation, current flow takes place directly between the electrodes, whereby it is ensured that the main or primary energy supply takes place in the wall region.

Regarding the refining and homogenizing process, this process takes place as described in the applicant's prior (German) application No. P 27 03 223.1. Therefore, this process need not be explained in any greater detail.

Still further, the arrangement of the electrodes according to the invention provides for direct heating of the discharge stream or flow, whereby the downwardly directed discharge stream or flow is rendered uniform. Additionally a glass melting furnace constructed according to the invention enables one to freely select the bath (melt) depths in the melting or refining and homogenizing sections, and thereby permits conforming the inventive glass melting furnaces to the existing constructional circumstances. The furnace of the invention is therefore particularly suited for the reconstruction of the glass melting furnaces, which becomes necessary in regular intervals. Finally, a further special advantage of the assembly according to the invention resides in the fact that the bottom electrodes experience less corrosion than wall electrodes, but also are easily accessible, thereby to facilitate maintenance, replacement and readjustment.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A glass melting furnace including a melting tank heated from above by burners comprising a melting section having a bottom; a refining and homogenizing section provided with electrodes for the supply of electrical energy wherein said electrodes are arranged in one or more planes (levels) of the refining section, said refining and homogenizing section having a bottom with an outlet therefrom, the bottom being positioned below that of the melting section; a dam which separates the melting section from the refining and homogenizing section, said dam having an upper edge which is disposed to enable a glass melt bath to flow thereover; and a bottom portion provided adjacent to the dam and which is disposed at a level substantially above the bottom of the homogenizing section.

2. The glass melting furnace according to claim 1, wherein a plurality of bottom electrodes are positioned in said bottom portion.

3. The glass melting furnace according to claim 2, wherein the bottom electrodes are positioned in a row or line along the dam.

4. The glass melting furnace according to claim 1, wherein wall electrodes are installed in the walls of the refining and homogenizing section.

5. The glass melting furnace according to claim 4, wherein the wall electrodes are disposed close to a transverse wall of the furnace.

6. The glass melting furnace according to claim 5, further comprising an electrode circuit wherein current flow takes place along the side walls and the transverse wall.

7. The glass melting furnace according to claim 1 wherein the dam is formed with a flat threshold-like configuration.

8. A glass melting furnace including a melting tank heated from above by heating means comprising a melting section having a bottom; a refining and homogenizing section provided with electrodes for the supply of electrical energy wherein said electrodes are arranged in one or more planes (levels) of the refining section, said refining and homogenizing section having a bottom with an outlet therefrom, the bottom being positioned below that of the melting section; a dam which separates the melting section from the refining and homogenizing section, said dam having a flat threshold-like configuration and a projection directed towards or facing the melting section and an upper edge which is disposed to enable a glass melt bath to flow thereover; and a bottom portion provided adjacent to the dam and which is disposed at a level substantially above the bottom of the homogenizing section.

9. The glass melting furnace according to claim 8, wherein the dam is curved.

10. The glass melting furnace according to claim 8 wherein the dam is backswept or angled with a point facing the melting section.

11. The glass melting furnace according to claim 8 wherein the dam is curved.

12. The glass melting furnace according to claim 8, wherein a plurality of bottom electrodes are positioned in said bottom portion.

13. The glass melting furnace according to claim 12, wherein the bottom electrodes are positioned in a row or line along the dam.

14. The glass melting furnace according to claim 8, wherein wall electrodes are installed in the walls of the refining and homogenizing section.

15. The glass melting furnace according to claim 14, wherein the wall electrodes are disposed close to a transverse wall of the furnace.

16. The glass melting furnace according to claim 8, further comprising an electrode circuit wherein current flow takes place along the side walls and the transverse wall.

* * * * *